United States Patent [19]

Kawaida et al.

[11] Patent Number: 4,510,012

[45] Date of Patent: Apr. 9, 1985

[54] TIRE MOLDING APPARATUS

[75] Inventors: Shinji Kawaida, Yamaguchi; Yoshio Okitsu; Kazunari Ikeda, both of Tokyo, all of Japan

[73] Assignee: Bridgestone Tire Co., Ltd., Tokyo, Japan

[21] Appl. No.: 602,982

[22] Filed: Apr. 23, 1984

[30] Foreign Application Priority Data

May 2, 1983 [JP] Japan .................................. 58-77872

[51] Int. Cl.³ .......................................... B29H 17/16
[52] U.S. Cl. ..................................... 156/415; 156/420
[58] Field of Search ..................... 156/394.1, 397, 402, 156/414, 415, 417, 420; 425/36; 249/178, 180, 181, 182, 184

[56] References Cited

U.S. PATENT DOCUMENTS

| | | | |
|---|---|---|---|
| 2,313,035 | 3/1943 | Breth | 156/402 X |
| 2,514,215 | 7/1950 | Stevens et al. | 156/420 X |
| 3,485,700 | 12/1969 | Cooper et al. | 156/417 |
| 3,787,262 | 1/1974 | Appleby et al. | 156/417 X |
| 3,795,564 | 3/1974 | Mallory | 156/417 |
| 3,813,271 | 5/1974 | Riggs | 156/414 X |
| 3,868,203 | 2/1975 | Turk | 156/417 X |
| 4,206,010 | 6/1980 | Gutknecht | 156/415 |
| 4,312,696 | 1/1982 | Bryant | 156/415 |
| 4,425,180 | 1/1984 | Samokhvalov et al. | 156/415 |

FOREIGN PATENT DOCUMENTS

| | | | |
|---|---|---|---|
| 621294 | 5/1961 | Canada | 156/415 |
| 51-19871 | 6/1976 | Japan | 156/420 |
| 671156 | 12/1982 | U.S.S.R. | 156/414 |

Primary Examiner—J. Howard Flint, Jr.
Attorney, Agent, or Firm—Sughrue, Mion, Zinn, Macpeak & Seas

[57] ABSTRACT

A tire molding apparatus having a hollow rotary shaft, a plurality of first drum segments are arranged substantially in the form of a cylinder around the front end portion of said rotary shaft. The second drum segments are paried with the first drum segments, thus forming a molding drum. A diameter changing mechanism is provided between the rotary shaft and the first and second drum segments for transmitting rotation of said rotary shaft to the first and second drum segments and additionally for moving the first and second drum segments radially. A plurality of threaded shafts, each having both end portions threaded in the opposite directions, are screwed respectively into the first and second drum segments thus paired. Rotation of the threaded shafts causes the first and second drum segments to move towards each other or to move away from each other to change the width of the molding drum. A drive shaft inserted into said rotary shaft allows the drive shaft to rotate separately from the rotary shaft and a supporting member is coupled to the front end of the rotary shaft in such a manner that the supporting member can turn together with the rotary shaft. A plurality of rotating shafts are supported on the supporting member with the rotating shafts being synchronously turned through an angle by the drive shaft. A plurality of transmission members transmit rotation of the rotating shafts to the threaded shafts, respectively.

11 Claims, 7 Drawing Figures

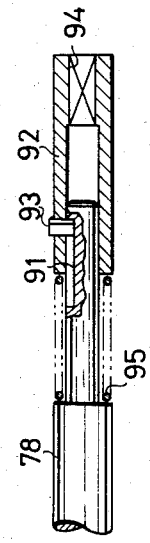
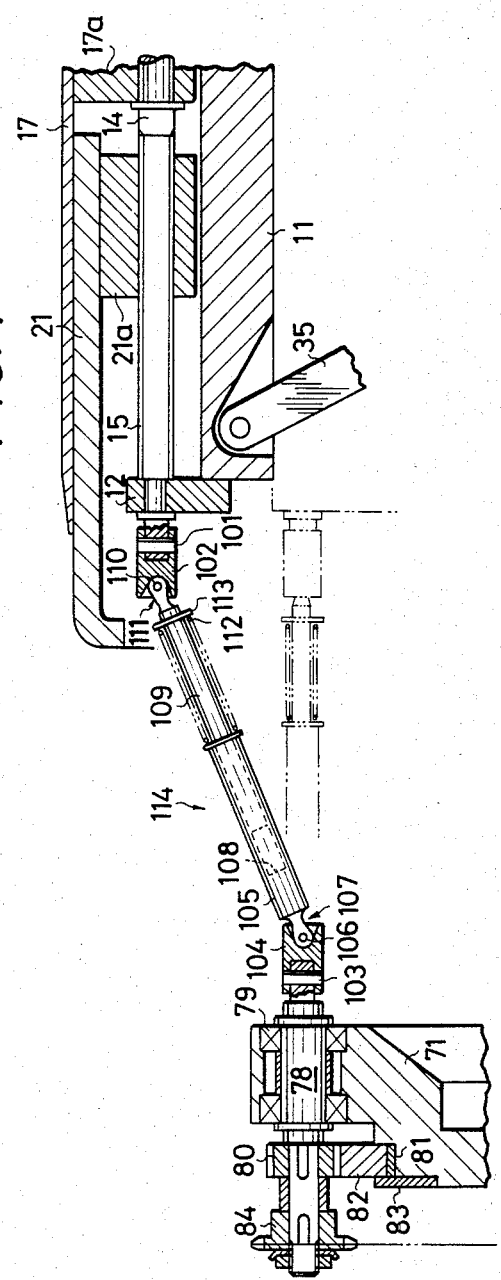
FIG. 6
FIG. 7

TIRE MOLDING APPARATUS

BACKGROUND OF THE INVENTION

This invention relates to a tire molding apparatus having a tire molding drum the diameter and width of which can be changed.

One example of a conventional tire molding apparatus is as described in the specification of Japanese Patent Application Publication No. 2436/1977. The conventional apparatus comprises: a rotary shaft; a plurality of first drum segments arranged around the front end portion of the rotary shaft, thus forming a cylinder; a plurality of second drum segments arranged around the rear end portion of the rotary shaft, thus forming a cylinder, the second drum segments being paired with the first drum segments, respectively, to form a molding drum; a diameter changing mechanism disposed between the rotary shaft and the first and second drum segments, for transmitting the rotation of the rotary shaft to the first and second drum segments and for moving the first and second drum segments radially to change the diameter of the molding drum; and a plurality of threaded shafts, each having both ends threaded in the opposite directions which are screwed into the first and second drum segments, respectively, the threaded shafts being turned to cause the first and second drum segments to move towards each other or to move away from each other.

The prior art apparatus is disadvantageous in several respects. To change the width of the molding drum, each threaded shaft is turned with a handle to cause the first and second drum segments coupled to the threaded shaft to move towards each other or to move away from each other. Accordingly, the adjusting operation must be carried out as many times as there are of threaded shafts. Accordingly efficiency of the operation is low. Furthermore, as the width of the molding drum is changed by individually adjusting the widths of the first and second drum segments in pairs, in the molding drum the first and second drum segments may provide different widths.

SUMMARY OF INVENTION

In view of the difficulties accompanying a prior art tire molding apparatus, an object of this invention is to provide a tire molding apparatus in which the width of the molding drum can be adjusted with high efficiency and with high accuracy.

The foregoing object and other objects of the invention have been achieved by the provision of a tire molding apparatus which, according to the invention, comprises: a hollow rotary shaft; a plurality of first drum segments arranged substantially in the form of a cylinder around the front end portion of the rotary shaft; a plurality of second drum segments arranged substantially in the form of a cylinder around the rear end portion of the rotary shaft, the second drum segments being paired with the first drum segments, thus forming a molding drum; a diameter changing mechanism provided between the rotary shaft and the first and second drum segments, for transmitting the rotation of the rotary shaft to the first and second drum segments and for moving the first and second drum segments radially; a plurality of threaded shafts, each having both end portions threaded in the opposite directions which are screwed into the first and second drum segments in pair, the threaded shafts being turned to cause the first and second drum segments to move towards each other or to move away from each other to change the width of the molding drum; a drive shaft inserted into the rotary shaft in such a manner that the drive shaft can rotate separately from the rotary shaft; a supporting member coupled to the front end of the rotary shaft in such a manner that the supporting member can turn together with the rotary shaft; a plurality of rotating shafts supported on the supporting member, the rotating shafts being synchronously turned through the same angle by the drive shaft; and a plurality of transmission members for transmitting the rotation of the rotating shafts to the threaded shafts; respectively.

In the apparatus of the invention, in order to change the width of the molding drum, the drive shaft is rotated separately from the rotary shaft at rest, so that the rotation of the drive shaft is transmitted to the plurality of rotating shafts to synchronously turn the latter through the same angle. The rotation of these rotating shafts is transmitted to the threaded shafts to turn them so that all the first and second drum segments in pairs are simultaneously caused to move the same distance towards or away from each other. In molding a tire, the rotary shaft is turned, and the supporting member which supports the rotating shafts is rotated together with the rotary shaft. Therefore, the shafts are maintained at a corresponding position to the threaded shafts, i.e., the angular positions of the rotating shafts with respect to the rotary shaft are maintained unchanged.

BRIEF DESCRIPTION OF THE DRAWINGS

FIG. 6 is an enlarged sectional view of the transmission member and its relevant components; and FIG. 7 is a sectional view showing essential components of another embodiment of the invention.

DESCRIPTION OF THE PREFERRED EMBODIMENT

One embodiment of this invention will be described with reference to the accompanying drawings.

Figure 1:
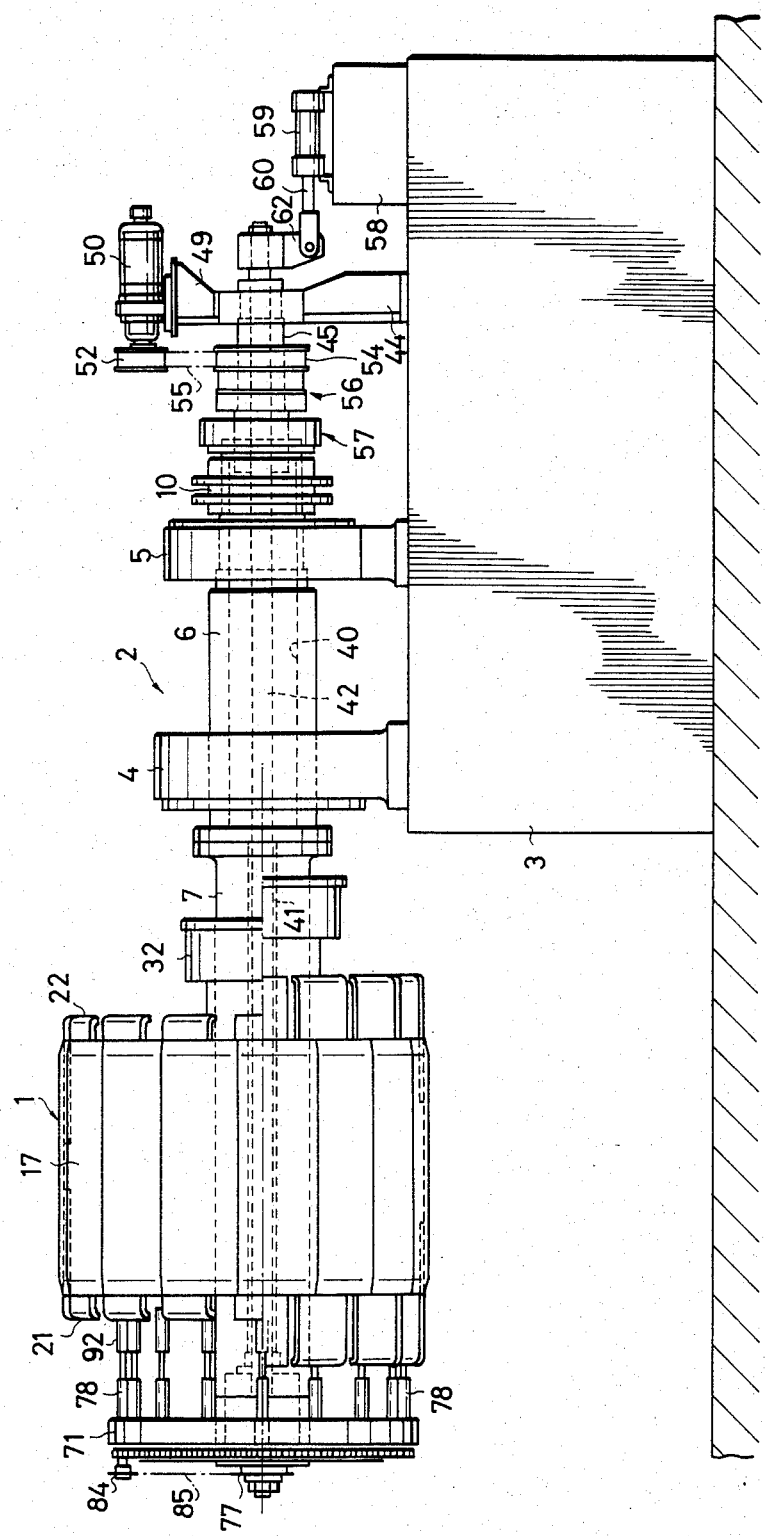
FIG. 1 is a front view of a tire molding apparatus according to a first embodiment of this invention, with the upper half indicating a state of a molding diameter in which its diameter is increased and its width is decreased, and with the lower half of the figure indicating a state of the molding diameter in which the diameter is decreased and the width is increased.
Figure 2:
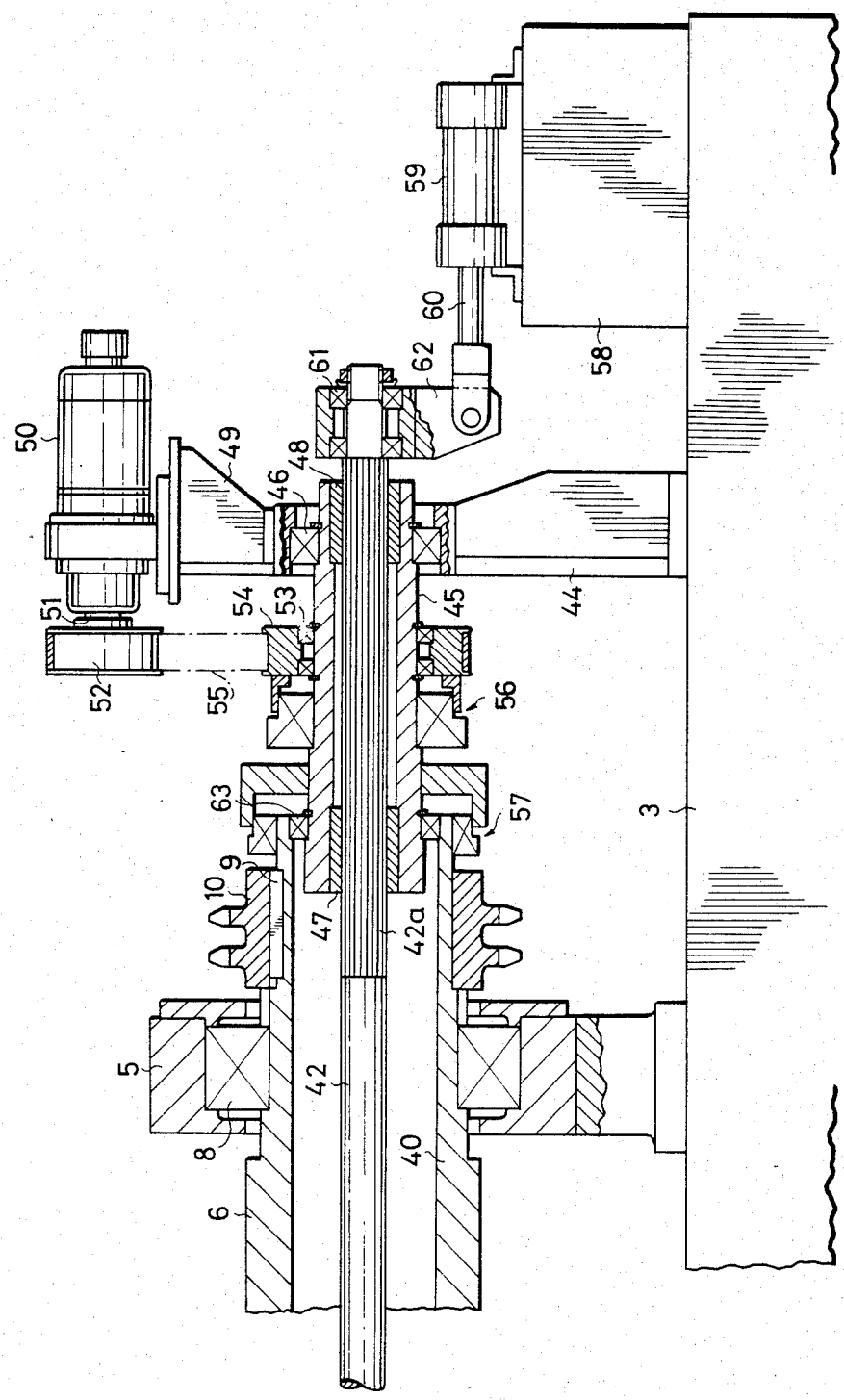
FIG. 2 is a front view, with parts cut away, showing rotating drive components in FIG. 1.

As shown in FIG. 1, a tire molding apparatus 2 has a drum 1 used as the molding drum. The diameter and the width of the molding drum can be changed as required. The tire molding apparatus 2 further comprises a base 3 on which a pair of bearing stands 4 and 5 are mounted, and a hollow connecting shaft 6 which is oriented horizontally. One end of the connecting shaft 6 is coupled to a hollow rotary shaft 7 in such a manner that the shafts are coaxial with each other. The connecting shaft 6 is inserted into the bearing stands 4 and 5 and is rotatably supported through a bearing 8 by the bearing stands, as shown in FIG. 2, so that it is rotated together with the shaft 7.

A sprocket 10 is fixedly mounted on the rear end portion of the connecting shaft 6 through a key 9. An endless chain belt is laid over the sprocket 10 and the sprocket of an electric motor (not shown). Therefore, as the motor operates, the connecting shaft 6 and the rotary shaft 7 turn as one unit around the axis thereof.

Figure 3:
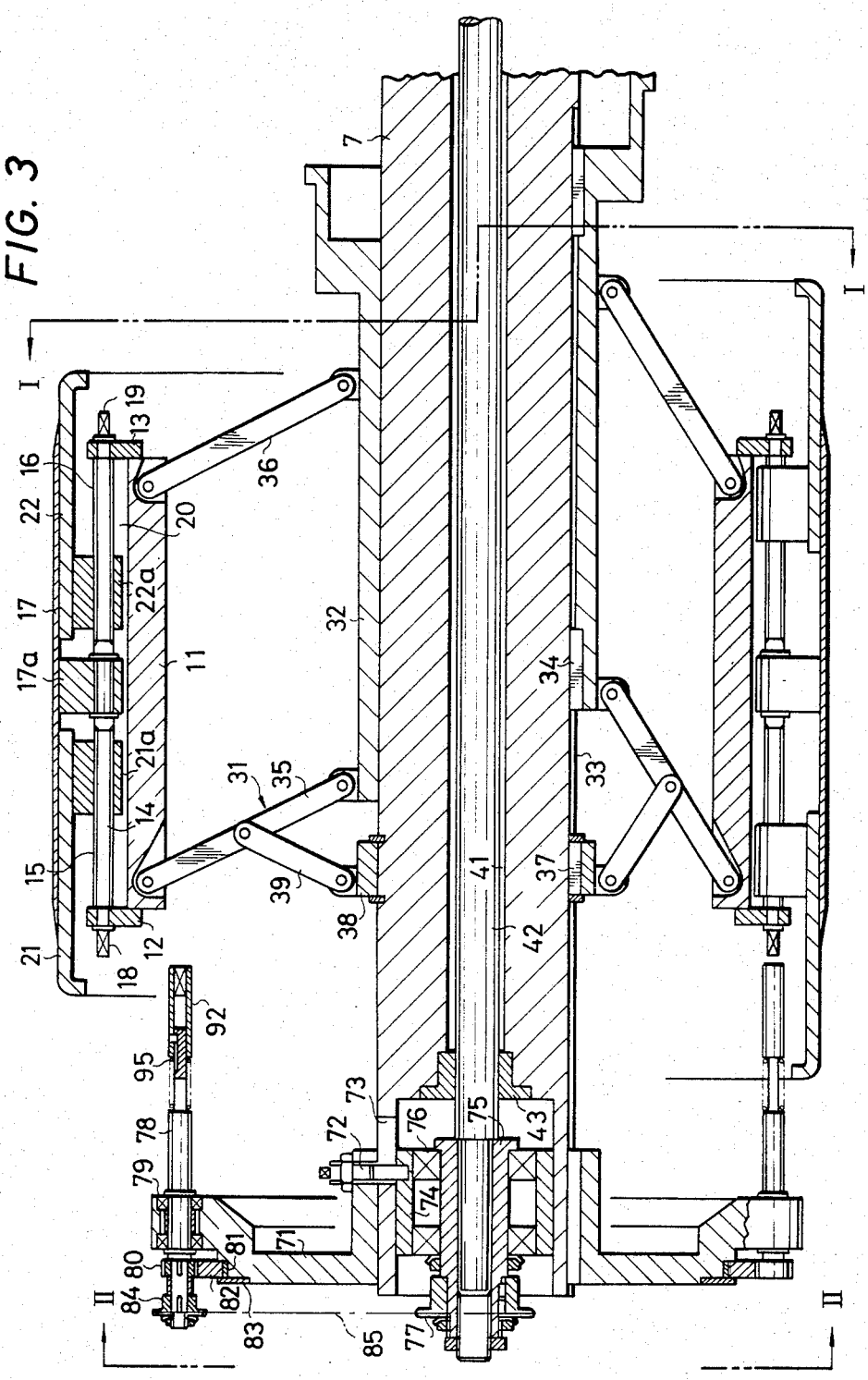
FIG. 3 is a sectional view showing a molding drum in FIG. 1, with the upper half indicating a state of the molding drum in which the diameter is increased and the width is decreased and with the lower half indicating a state of the molding drum in which the diameter is decreased and the width is increased.
Figure 4:
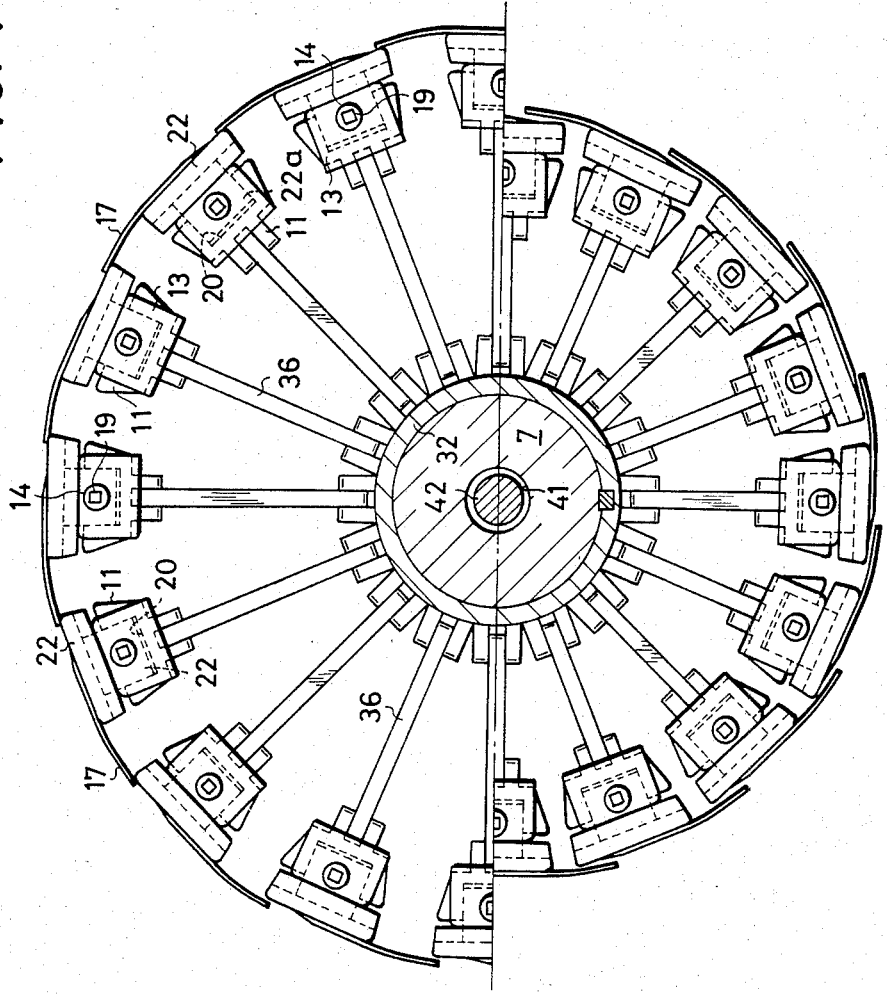
FIG. 4 is a sectional view in the direction of the arrow I—I in FIG. 3.

As shown in FIGS. 3 and 4 a plurality of base brackets 11 are provided around the rotary shaft 7 in such a manner that they are arranged at equal intervals circumferentially and equidistant from the rotary shaft 7. The base brackets are also in parallel with the rotary shaft 7.

Bearing brackets 12 and 13 are fixedly secured to both ends of each base bracket 11 and both ends of a threaded shaft 14 are rotatably supported by the bearing brackets 12 and 13 in such a manner that the shaft 14 is in parallel with the rotary shaft 7. Screwthreads 15 and 16, the thread directions of which are opposite to each other, are cut on both end portions of the shaft 4, respectively. A plurality of arcuate drum segments 17 are provided around the middle part of the rotary shaft 7 in such a manner that they form a cylinder. Each arcuate drum segment 17 has a supporting block 17a on the inside. The threaded shaft 14 is inserted into the supporting block 17a in such a manner that the middle portion of the threaded shaft 14 is rotatably supported by the supporting block 17a and the threaded shaft 14 is not moved in the axial direction. The two ends of the threaded shaft 14 that protrude from the bearing brackets 12 and 13 are formed into rectangular parts 18 and 19 that are square in section. A guide groove 20 is formed in the outside of the base bracket 11 confronting the threaded shaft 14 in such a manner that it is in parallel with the threaded shaft 14.

A plurality of first drum segments 21 are provided around the front end of the rotary shaft 7 in such a manner they are arranged circumferentially at equal intervals and and equidistant from the rotary shaft 7. The first drum segments 21 are slidably in contact with the insides of the front end portions of the arcuate drum segments 17 and are, in the form of a cylinder. Each of the first drum segments 21 has a supporting block part 21a which is slidably engaged with the guide groove 20 described above. The screw 15 of the threaded shaft 14 is screwed into the supporting block part 21a.

Similarly, a plurality of second drum segments 22 are provided around the rear end portion of the rotary shaft 7. The second drum segments 22 are paired with the first drum segments 21, respectively. The second drum segments 22 are in sliding contact with the insides of the insides of the rear end portions of the arcuate drum segments 17 and are arranged in the form of a cylinder as a whole. Each of the second drum segments 22 has a supporting block part 22a on the inside which is slidably engaged with the guide groove 22. The screw 16 of the threaded shaft 14 is screwed into the supporting block part 22a. Therefore, as the threaded shaft 14 is turned, the first and second drum segments 21 and 22 are moved either towards each other or displaced from each other. Thus, as all the threaded shafts 14 are rotated, the width of the molding drum 14 is changed (increased or decreased).

A diameter changing mechanism 31 (FIG. 3) is provided for each base bracket 11. The mechanism 31 is used to transmit the rotation of the rotary shaft 7 to the arcuate, first and second drum segments 17, 21 and 22, and to move these segments radially thereby to change the diameter of the molding drum 1. Each of the diameter changing mechanisms 31 has a slider 32 which engages with the rotary shaft 7 and is reciprocated in the axial direction by reciprocating means (not shown). The slider 32 is coupled to the rotary shaft 7 in such a manner that it is turned together with the rotary shaft through a key 34 in a key groove 33 cut in the rotary shaft 7.

As shown in FIG. 3 plurality of links 35 and a plurality of links 36 are arranged at equal intervals around both ends of the slider 32, respectively, in such a manner that their inner ends are coupled for swinging movement to the slider 32 and their outer ends are coupled for rocker movement to the ends of the base brackets 11. A stationary ring 38 is fixedly mounted on the rotary shaft 7 through a key 37 inserted in the key groove 33. A plurality of links 37 are swingably coupled to the stationary ring 38. The outer ends of the links 37 swingably coupled to the middle parts of the links 35, respectively. Therefore, as the slider 32 reciprocates along the rotary shaft 7, the links 35, 36 and 39 are inclined, so that the arcuate, first and second drum segments are moved radially to change the diameter of the molding drum 1. The slider 32, the stationary ring 38 and the links 35, 36 and 39 form the aforementioned diameter changing mechanism 31.

As shown in FIGS. 2, 3 and 4, a long drive shaft 42 is inserted into the hollows 40 and 41 of the shafts 6 and 7. The front end portion of the drive shaft 42 is rotatably supported on a bushing 43 fixed to the rotary shaft. A bearing stand 44 is installed behind the bearing stand 5 on the base 3. A transmission shaft 45 is rotatably supported at its rear end portion through a bearing 46 on the bearing stand 44. The transmission shaft 45 is a hollow shaft into which the rear end portion of the drive shaft 42 is inserted. Bushings 47 and 48 are fixedly secured to the inner surfaces of both ends portions of the transmission shaft 45. The bushings 47 and 48 are spline-coupled with a spline 42a formed on the rear end portion of the drive shaft 42. Therefore, the drive shaft 42 and the transmission shaft 45 are turned as one unit and are movable relative to each other.

An electric motor 50 with a reduction gear is fixedly mounted through a bracket 49 on the bearing stand 44. A pulley 52 is mounted on the rotary shaft 51 of the motor 50. A pulley 54 is rotably mounted through a bearing 53 on the transmission shaft 45. An endless belt 55 is laid over pulleys 54 and 52. A clutch 56 is provided between the pulley 54 and the transmission shaft 45. Upon engagement of the clutch 56 the rotation of the pulley 54 is transmitted to the transmission shaft 45. Upon disengagement of the clutch 56, the pulley 54 and the transmission shaft 45 can turn irrespective to each other.

A clutch 57 is provided between the transmission shaft 45 and the connecting shaft 6. Upon engagement of the clutch 57, the rotation of the connecting shaft 6 is transmitted to the transmission shaft 45, so that the connecting shaft 6, the rotary shaft 7, the transmission shaft 45 and the drive shaft 42 are turned as one unit. Upon disengagement of the clutch 57, the transmission shaft 45 and the drive shaft 42 can turn separately from the connecting shaft 6 and the rotary shaft 7. Thus, by operating the clutch 57, the drive shaft 42 is turned either together with the rotary shaft or separately from it.

A stand 58 is installed on the base 3. A cylinder 59 is mounted on the stand 58. The end of the piston rod 60 of the cylinder 59 is coupled to a bracket 62 which is supported by the rear end of the drive shaft 42 through a bearing. Therefore, as the cylinder 59 operates, the drive shaft 42 is reciprocated in the axial direction. A bearing 63 is inserted between the rear end of the connecting shaft 6 and the front end of the transmission shaft 45.

Figure 5:
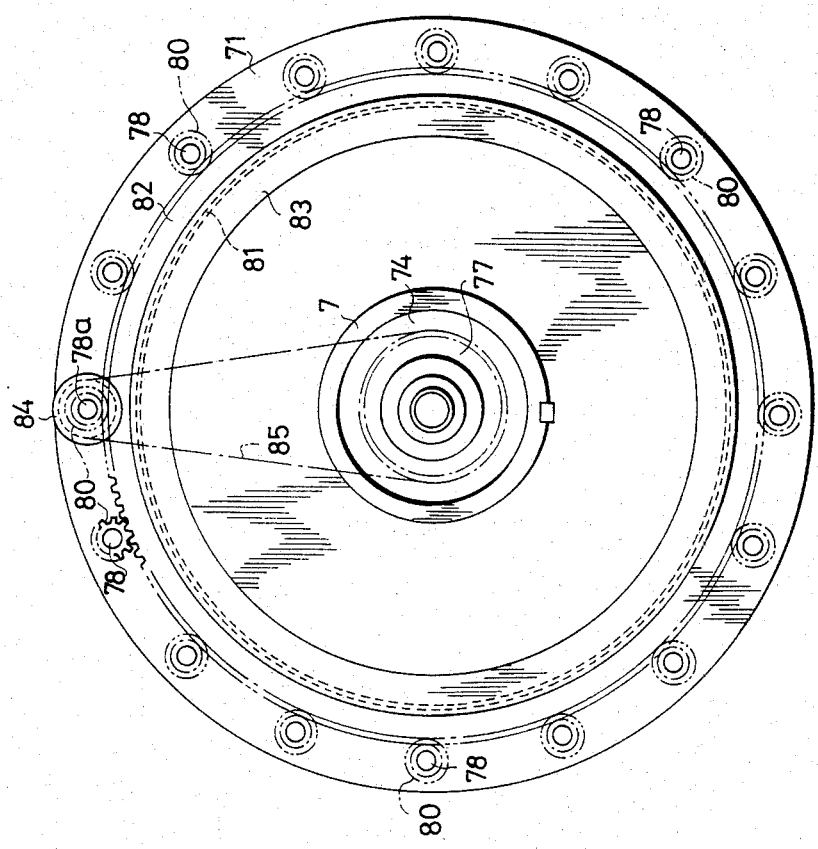
FIG. 5 is a sectional view in the direction of the arrow II—II in FIG. 3.

As shown in FIGS. 3 and 5, a substantially disc-shaped supporting member 71 is fitted on the front end of the rotary shaft 7. A pin 72 is fixedly secured to the supporting member 7. The pin 72 is inserted in an elongated hole 73 which is cut in the front end portion of the rotary shaft 7 in such a manner that it extends in the axial direction. The pin 72 is further inserted into a sleeve 74 which is fitted into the front end portion of the rotary shaft 7. Therefore, the supporting member 71 is rotatable together with the rotary shaft 7 and movable in the axial direction of the rotary shaft 7. A bushing 75 is fixedly mounted on the end portion of the drive shaft 42 and a bearing 76 is interposed between the bushing 75 and the sleeve 74.

The reciprocation of the drive shaft 42 is transmitted through the bearing 76, the sleeve 74 and the pin 72 to the supporting member 71. A sprocket 77 is fixedly mounted on the end portion of the drive shaft 42 which protrudes from the rotary shaft 7. A plurality of rotating shafts 78 are rotatably supported on the peripheral portion of the supporting member 71 through bearings 79 in a manner that they are in parallel with the rotary shaft 7 (FIG. 5) and they are coaxial with the threaded shafts 14 when the drum diameter is reduced to a minimum.

A small gear 80 is fixedly mounted on each rotating shaft 78. The small gears 80 have the outer teeth which are engaged with a large gear 82 which is rotatably supported by the supporting member 71 through a bushing 81. Therefore, as the large gear 82 turns, all of the rotating shafts 78 are synchronously turned through the same angle. A stopper 83 is provided so that the large gear 82 may not come off the supporting member 71. A sprocket 84 is mounted on one (78a) of the rotating shafts 78. An endless chain belt 85 is laid over the sprocket 84 and the aforementioned sprocket 77. Accordingly, the rotation of the drive shaft 42 is transmitted through the chain belt 85 to the rotating shaft 78a, and the rotation of the rotating shaft 78a is transmitted through the gears 80 and 82 to the remaining rotating shafts 78 simultaneously.

A cylindrical transmission member 92 is placed on the end portion of each rotation shaft 78 as shown in FIG. 6. A key 93 inserted into the transmission member 92 is also inserted in a key groove 91 cut in the rotating shaft 78. Therefore, the transmission member 92 is movable along the rotating shaft 78 and can be turned together with the rotating shaft 78. The transmission member 92 has a rectangular hole 94 square in section at the end. When the rectangular hole 94 is engaged with the rectangular part 18 of the threaded shaft 14, (FIG. 3) the rotation of the rotating shaft 78 is transmitted to the threaded shaft 14. The transmission member 92 is urged towards the threaded shaft 14 by a spring 95. The spring 95 absorbs shock which may be caused when the rectangular part 18 is inserted into the rectangular hole 94.

The operation of the tire molding apparatus thus constructed will be described.

Where it is required to change the width of the molding drum 1, the rotation of the rotary shaft 7 is stopped. Then the slider 32 is moved backwardly along the rotary shaft 7. As a result, the links 35, 36 and 39 are inclined and the arcuate, first and second drum segments 17, 21 and 22 are moved as one unit, radially inwardly. Accordingly, the diameter of the molding drum 1 is reduced, and at the same time the threaded shafts 14 are maintained coaxial with the transmission members 92, respectively. Then, the cylinder 59 is operated to retract the piston rod 60 to move the drive shaft 42 backwardly. In this operation, the pin 72 slides along the elongated hole 73 to move the supporting member 71 backwardly. As a result, as the transmission members 92 of the rotating shafts 78 approach the threaded shafts 14, the rectangular parts 18 of the threaded shafts 14 are engaged with the rectangular holes 94 of the transmission members 92, respectively; that is, the rotating shafts 78 are coupled through the transmission members 92 to the threaded shafts 14, respectively. In this condition, the clutch 56 is engaged while the clutch 57 is disengaged. Accordingly, the pulley 54 can turn together with the drive shaft 42, and the drive shaft 42 can turn separately from the rotary shaft 7.

Next, the motor 50 is driven. The rotation of the rotary shaft 51 of the motor 50 is transmitted through the pulley 52, the belt 55, the pulley 54, the clutch 56 and the bushing 48 to the drive shaft 42. Thus the drive shaft 42 is turned separately from the rotary shaft 7. The rotation of the drive shaft 42 is transmitted through the sprocket 77, the chain belt 85 and the sprocket 84 to rotate the particular rotating shaft 78a. The rotation of the rotating shaft 78a is transmitted through its transmission member 92 to the respective threaded shaft 14.

At the same time, the small gear 80 of the rotating shaft 78a turns the large gear 82, so that the small gears of the remaining rotating shafts 78 engaged with the large gear 82 are turned. That is, the rotating shafts 78 are turned through the same angle in synchronization with the rotating shaft 78a. The rotation of each rotating shaft 78 is transmitted through its transmission member to the respective threaded shaft 14. Hence, all of the threaded shafts 14 are turned through the same angle. As a result, the first and second drum segments 21 and 22 are moved towards each other or left from each other, whereby the width of the tire molding drum 1. In this operation, all the threaded shafts 14 are turned simultaneously. Therefore, no matter now many threaded shafts 14 are employed, the width of the tire molding drum is changed in the time required for turning one threaded shaft. Thus, the working efficiency is remarkably improved. Since all the threaded shafts 14 are turned through the same angle, the amount of width alteration by the first and second drum segments paired are equal to each other.

After the width has been changed as described above, the clutch 57 is engaged while the clutch 56 is disengaged. As a result, the rotary shaft 7, the transmission shaft 45 and the drive shaft can turn as one unit, and the pulley 54 can be at rest even though the transmission shaft 45 is turned.

Under this condition, the cylinder 59 is operated to extend the piston rod 60 thereby to move the drive shaft 42 forwardly. As a result, the transmission members 92 are returned to the initial positions, being disengaged from the threaded shafts 14. Next, the slider 32 is moved forwardly to raise the links 35, 36 and 39, so that the arcuate, first and second drum segments 17, 21 and 22 are moved radially outwardly. Thus, the diameter of the molding drum 1 has been increased.

Under this condition, one end of a belt-shaped rubber material for molding tires is returned by the drum, and the sprocket 10 is turned to rotate the rotary shaft 7. The rotation of the rotary shaft 7 is transmitted through the diameter changing mechanisms 31 to the arcuate, first and second drum segments 17, 21 and 22, so that these segments are turned together with the rotary shaft 7. Accordingly, the belt-shaped rubber material is wound on the molding drum 1. In this operation, the supporting member 71 and the rotary shaft 7 turn as one unit. Therefore, the angular position of the shafts 78 and 14 with respect to the rotary shaft 7 is maintained unchanged. Since the clutch 57 has been engaged, the rotary shaft 7 and the drive shaft 42 turn as one unit. In addition, as the rotating shafts 78 are supported on the supporting member 71 which is turned together with the rotary shaft 7, the rotating shafts 78 revolve around the axis of the rotary shaft 7 but they do not rotate on their axes. Accordingly, while the rotary shaft 7 is turned, the rotational angular positions of the rotating shafts and of the transmission members 92 are maintained unchanged.

If the rotational angular positions are changed, then the rectangular parts 18 of the threaded shafts 14 cannot be engaged with the rectangular holes 94 of the transmission members 92 in the next operation of changing the width of the drum. Since the clutch 56 has been disengaged, the rotation of the transmission shaft 45 is not transmitted to the motor 50 through the pulley 54 and the belt 55. If the rotation of the transmission of shaft 45 is transmitted to the motor 50, then the armature or the rotor of the motor is turned through the reduction gear. As a result a great load is applied to the rotary shaft 7 and the efficiency of energy is greatly lowered. After the belt-shaped rubber material has been wound on the drum and other components have been molded, the diameter of the molding drum is reduced, and the cylindrical molded tire is removed from the molding drum 1.

FIG. 7 illustrates an embodiment of the invention. In FIG. 7, those common parts which have been described with reference to FIGS. 1 through 6 are therefore designated by the same reference numerals so that their detailed descriptions can be omitted. Only components different from those in the first embodiment are described.

The end of each threaded shaft 14 protruding from the bearing bracket 12 is connected to a coupling block 102 with a pin 101. Similarly, the end of each rotating shaft 78 is connected to a coupling block 104 with a pin 103. A holder 105 has one end coupled to the coupling block 107 through a spherical articulation joint 107 including a pin 106. A rectangular hole 108 is formed in the other end, A rectangular shaft 109 is coupled to the coupling block 102 through a spherical articulation joint 111 including a pin 110. The other end portion of the rectangular shaft 109 is slidably inserted into the rectangular hold 108 of the holder 105. A spring 112 is interposed between the end face of the holder 105 and a flange 113 formed at the end of the rectangular shaft 109. The coupling blocks 102 and 104, the holder 105 and the rectangular shaft 109 form a transmission member 114. The rotating shafts 78 are maintained coupled through the transmission members 114 to the threaded shafts 14, respectively. Therefore, it is unnecessary to move the drive shaft 42 in the axial direction. Accordingly, the cylinder 59, the bracket 62, the bearing 61 and the elongated hole 73 can be eliminated. The apparatus can be simplified in construction and reduced in size as much.

In the case where it is required to change the width of the molding drum 1, as in the above-described case, the diameter of the molding drum 1 is decreased so that the transmission members 114 are coaxial with the rotating shafts 78 and the threaded shafts 14, respectively, as indicated by the phantom lines in FIG. 7. Then the width of the molding drum is changed. Furthermore, the width of the molding drum 1 may be changed after the diameter of the molding drum 1 has been increased. The other arrangements and functions are the same as those of the first embodiment described above.

As is apparent from the above description, the tire molding apparatus according to the invention comprises: the hollow rotary shaft; the first drum segments arranged around the front end portion of the rotary shaft, thus substantially forming a cylinder; the second drum segments arranged around the rear end portion of the rotary shaft, thus substantially forming a cylinder, the second drum segments being paired with the first drum segments to form a molding drum; diameter changing mechanism provided between said first and second drum segments, for transmitting rotation of the rotary shaft to the first and second drum segments radially to change the diameter of the molding drum; the threaded shafts, each having both ends threaded in the opposite directions which are screwed respectively into said first and second drum segments thus paired, the threaded shafts being turned to move said first and second drum segments towards each other or move them away from each other thereby to change the width of the molding drum; the drive shaft inserted into the rotary shaft in such a manner that it can rotate separately from the rotary shaft; the supporting member coupled to the front end of the rotary shaft in such a manner that it can turn together with the rotary shaft; the rotating shafts supported on the supporting member, the rotating shafts being turned through the same angle by the drive shaft; and the transmission members for transmitting rotation of the rotating shafts to the threaded shafts, respectively. Therefore, the apparatus can adjust the width of the molding drum with high efficiency and with high accuracy.

We claim:
1. A tire molding apparatus comprising:
a hollow rotary shaft having a drive shaft inserted therein;
first drum segments arranged around one end portion of said rotary shaft;
second drum segments arranged around the other end portion of said rotary shaft, said first and second drum segments being paired with each other to form a molding drum;
diameter changing means provided between said rotary shaft and first and second drum segments for transmitting rotation of said rotary shaft to said first and second drum segments;
threaded shafts screwed respectively into said first and second drum segments to form pairs, wherein rotation of said threaded shafts cause said first and second drum segments to move toward or away from each other and thereby vary the width of said molding drum;

supporting means coupled to one end of said rotary shaft for rotation with said rotary shaft;

a plurality of rotating shafts supported on said supporting means synchronously rotated by said drive shaft; and transmission members for transmitting rotation of said rotary shafts to said threaded shafts.

2. The tire molding apparatus of claim 1 wherein said diameter changing mechanism comprises a slider engaging said rotary shaft and rotating with said rotary shafts links arranged around said slider, and brackets for coupling said links to said first and second drum segments wherein as said rotary shaft turns, said slider rotates and inclines said links to radially move said first and second drum segments to alter the diameter of said molding drum.

3. The tire molding apparatus of claim 1 wherein said first drum segments are arranged to form a cylinder around a front end portion of said rotary shaft.

4. The tire molding apparatus of claim 1 wherein said second drum segments are arranged to form a cylinder around the rear end portion of said rotary shaft.

5. The tire molding apparatus of claim 1 wherein said diameter changing means moves said first and second drum segments radially.

6. The tire molding apparatus of claim 1 wherein said drive shaft and said rotary shaft are separately rotatable.

7. The tire molding apparatus of claim 1 wherein said threaded shafts have respective end portions threaded in opposite direction, each end of said threaded shafts having means engaging said transmission members, whereby rotation of said rotating shafts is converted into movements of said first and second drum segments.

8. The tire molding apparatus of claim 7 wherein said transmission members comprises a hollow shaft mounted on the end of a respective rotating shaft, a resilient member urging said hollow shaft towards said means engaging said transmission member on a threaded shaft and an end portion coupling with said means engaging said transmission members.

9. The tire molding apparatus of claim 8 further comprising a key groove cut into each of said rotating shafts and a key inserted into said hollow shaft and said key groove for coupling a transmission member to a rotating shaft.

10. The tire molding apparatus of claim 1 wherein said transmission members comprise a pair of coupling blocks, one of said coupling blocks joining each rotating shaft to a holder and the other of said coupling blocks joining said threaded shaft to an articulation joint and an intermediate shaft having said holder on one end and said articulation joint on the other end.

11. The tire molding apparatus of claim 10 further comprising a spring interposed between said holder and said intermediate shaft.

* * * * *

UNITED STATES PATENT AND TRADEMARK OFFICE
CERTIFICATE OF CORRECTION

PATENT NO. : 4,510,012
DATED : April 9, 1985
INVENTOR(S) : Shinji KAWAIDA; Yoshio OKITSU; Kazunari IKEDA It is certified that error appears in the above-identified patent and that said Letters Patent is hereby corrected as shown below:

On the title page;
The Assignee should be listed as follows:

Bridgestone Corporation
Tokyo, Japan

Signed and Sealed this

Tenth Day of September 1985

[SEAL]

Attest:

DONALD J. QUIGG

Attesting Officer      Acting Commissioner of Patents and Trademarks - Designate